US009934954B2

(12) United States Patent
Schlueter

(10) Patent No.: US 9,934,954 B2
(45) Date of Patent: Apr. 3, 2018

(54) QUADRUPOLE MASS SPECTROMETER

(71) Applicant: Thermo Fisher Scientific (Bremen) GmbH, Bremen (DE)

(72) Inventor: Hans-Juergen Schlueter, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 15/414,007

(22) Filed: Jan. 24, 2017

(65) Prior Publication Data

US 2017/0213717 A1 Jul. 27, 2017

(30) Foreign Application Priority Data

Jan. 27, 2016 (GB) .................................. 1601496.1

(51) Int. Cl.
*B01D 59/44* (2006.01)
*H01J 49/02* (2006.01)
(Continued)

(52) U.S. Cl.
CPC ...... *H01J 49/4225* (2013.01); *H01J 49/0031* (2013.01); *H01J 49/063* (2013.01); *H01J 49/4215* (2013.01)

(58) Field of Classification Search
USPC ....... 250/281, 282, 290, 293, 294, 296, 297, 250/396 R
See application file for complete search history.

(56) References Cited

U.S. PATENT DOCUMENTS 4,553,029 A * 11/1985 Matsuda ................. H01J 49/06 250/296
8,604,423 B2 * 12/2013 Enke ................... H01J 49/0031 250/281
(Continued)

FOREIGN PATENT DOCUMENTS

JP 6182653 A 4/1986
JP 0845468 A1 2/1996
(Continued)

OTHER PUBLICATIONS

GB1516508.7, filed Sep. 17, 2015 (specification, claims, figures only), 34 pgs.

*Primary Examiner* — Bernard Souw
(74) *Attorney, Agent, or Firm* — A. J. Gokcek

(57) ABSTRACT

In mass spectrometry, ion optics process a received ion beam into an output ion beam travelling in an output direction and having a spatial distribution in a plane perpendicular to the output direction elongated in one dimension of the plane relative to the other dimension of the plane and defines an axis of elongation thereby. A quadrupole ion optical device comprises first and second pairs of opposing elongated electrodes, receiving the output ion beam travelling along the output direction and defining an acceptance axis in a plane perpendicular to the direction of elongation of the first and second pairs of opposing elongated electrodes. The acceptance axis is an axis on which maximum acceptance of ions to the quadrupole ion optical device is attained. The first and second pairs of opposing elongated electrodes are oriented substantially to match the acceptance axis to the axis of elongation defined by the spatial distribution.

30 Claims, 9 Drawing Sheets

(51) Int. Cl.

| | |
|---|---|
| ***H01J 49/42*** | (2006.01) |
| ***H01J 49/00*** | (2006.01) |
| ***H01J 49/06*** | (2006.01) |

(56) References Cited

U.S. PATENT DOCUMENTS

| | | | | |
|---|---|---|---|---|
| 2006/0076485 | A1 * | 4/2006 | Stoermer .............. | H01J 49/065<br>250/290 |
| 2013/0020482 | A1 * | 1/2013 | Enke ....................... | H01J 49/40<br>250/282 |

FOREIGN PATENT DOCUMENTS

| | | | |
|---|---|---|---|
| JP | 0864169 | A | 3/1996 |
| JP | 2011216425 | A | 10/2011 |
| WO | WO2011106768 | A1 | 9/2011 |

* cited by examiner

QUADRUPOLE MASS SPECTROMETER

CROSS-REFERENCE TO RELATED APPLICATIONS

This application claims the priority benefit under 35 U.S.C. § 119 to British Patent Application No. 1601496.1, filed on Jan. 27, 2016, the disclosure of which is incorporated herein by reference.

TECHNICAL FIELD OF THE INVENTION

The invention concerns a mass spectrometer, comprising a quadrupole ion optical device (for example, a quadrupole ion trap or storage device) and especially a triple quadrupole mass spectrometer. Also considered is a corresponding method of mass spectrometry.

BACKGROUND TO THE INVENTION

Mass spectrometers using quadrupole ion optical devices are well known. A particular example of such instruments is the triple quadrupole mass spectrometer, typically used for tandem mass spectrometry. This comprises: a first, mass-selective quadrupole device, Q1, a second quadrupole device acting as a collision cell, for fragmentation of ions, Q2; and a third, mass-resolving quadrupole mass analyser, Q3. Many examples of instruments of this type are known, such as the TSQ 8000 ® or TSQ Quantum®, manufactured by Thermo Fisher Scientific, Inc. A further quadrupole device, Q0, is sometimes provided for use as a preliminary mass filter, ion guide or fragmentation cell. This can permit $MS^n$ operation.

Each quadrupole device comprises four parallel rods, arranged as two opposing pairs of electrodes. Generally, the pairs of rod electrodes have applied to them opposite phases of radio-frequency (RF) voltage and optionally DC voltage. Mass-selective quadrupoles generally have RF and DC applied to the electrodes, whereas quadrupoles acting as collision cells or ion guides typically have RF only applied. However, certain quadrupole devices may have only static voltages applied to them, for instance for beam shaping or an array of static lenses. The rods can have a circular, elliptical or hyperbolic cross-section. Alternatively, the rods can have a rectangular cross-section and are referred to as flat rod electrodes, in a configuration referred to as a flatapole or square quadrupole. The flat rod electrodes can have bevelled or straight edges. In all cases, the rods are elongated and the ions travel along the direction of rod elongation. Typically the rods in one quadrupole device are orientated in a plane perpendicular to the ions' direction of travel in the same way as those of another quadrupole device.

There are examples of instruments in which the relative orientations of the rods have been varied though. For example, in the TSQ Quantum® instrument, the relative orientation of the rods in the Q1 and Q3 devices is the same but is rotated by 45 degrees with respect to the curved Q2 collision cell. Although such rotational changes have been considered, these have been based on experimental trial and error. Moreover, no optimal approach has been determined and no rationale for such an optimisation has been identified. Thus, improving the performance of the mass spectrometer by setting the relative orientation of the rods in the quadrupole ion optical devices has not reliably been possible.

SUMMARY OF THE INVENTION

Against this background, there is provided a mass spectrometer and a method of mass spectrometry. Other preferred, optional and advantageous features are defined in the claims.

In one embodiment of the present invention, a mass spectrometer is provided. The mass spectrometer includes ion optics configured to receive an ion beam and process the received ion beam into an output ion beam, so as to cause the output ion beam to travel in an output direction and to have a spatial distribution in a plane perpendicular to the output direction that is elongated in one dimension of the plane relative to the other dimension of the plane and defines an axis of elongation thereby. The mass spectrometer also includes a quadrupole ion optical guide which includes first and second pairs of opposing elongated electrodes arranged to receive the output ion beam travelling along the output direction. The first and second pairs of opposing elongated electrodes define an acceptance axis in a plane perpendicular to the direction of elongation of the first and second pairs of opposing elongated electrodes, the acceptance axis being an axis on which maximum acceptance of ions to the quadrupole ion optical guide is attained. Further, the first and second pairs of opposing elongated electrodes are oriented substantially to match the acceptance axis to the axis of elongation defined by the spatial distribution.

Ion optics, upstream from a quadrupole device, cause the spatial (which may include an angular) distribution of the ions to become asymmetric. In particular, the spatial distribution typically becomes elongated along an axis, for example: if the spatial distribution becomes elliptical in extent, it may be elongated along the major axis of the ellipse; and if the spatial distribution becomes rectangular in extent (usually with rounded corners), it may be elongated along a diagonal (or multiple diagonals) of the rectangle or along the major axis of the rectangle. The quadrupole device has an acceptance axis, along which maximum acceptance of ions is attained. For example, for a quadrupole device with a first pair of opposing rods to which a negative DC potential is applied and a second pair of opposing rods to which a positive DC potential is applied, the acceptance axis may be defined between the first pair of opposing rods. In another example, a quadrupole device may have flat elongated electrodes and the acceptance axis may be defined by a gap between two of the electrodes and the opposing gap between the other two of the electrodes (and in particular, between the centers of these gaps). By matching up the acceptance axis to the spatial distribution's axis of elongation, the acceptance of ions to the quadrupole device is significantly improved.

In an alternative or additional sense, a particular scenario can be considered. The ion optics may cause a significant deflection of an ion beam, causing the spatial distribution of the ion beam to change from symmetrical to asymmetric (as discussed above). For example, a deflection of greater than 45 degrees and especially around 90 degrees may cause such a change. Additionally or alternatively, imprecise or incorrect mechanical or electronic adjustments may cause the ion beam to be somewhat off-axis or have a slightly tilted main axis with respect to the ideal, also leading to an asymmetric spatial distribution.

The ion optics may also comprise quadrupole rods (for instance, a bending quadrupole device) and the rods of the quadrupole device may be oriented to be rotated with respect to the quadrupole rods of the ion optics by an angle. This angle may be about 45 degrees or between 30 and 60 degrees and in some embodiments, between 35 and 55 degrees. An angle of 45 degrees may be more appropriate if the spatial distribution of the ion beam is more elliptical in extent and different angle (around 10 to 15 degrees different from 45 degrees) may be more suitable if the spatial distribution of the ion beam is more rectangular in extent.

In another embodiment of the present invention, a method of mass spectrometry is provided. The method includes receiving an ion beam at ion optics. The method also includes processing the received ion beam at the ion optics into an output ion beam, so as to cause the output ion beam to travel in an output direction and to have a spatial distribution in a plane perpendicular to the output direction that is elongated in one dimension of the plane relative to the other dimension of the plane and defines an axis of elongation thereby. The method further includes receiving the output ion beam travelling along the output direction at a quadrupole ion optical device including first and second pairs of opposing elongated electrodes. the first and second pairs of opposing elongated electrodes define an acceptance axis in a plane perpendicular to the direction of elongation of the first and second pairs of opposing elongated electrodes, the acceptance axis being an axis on which maximum acceptance of ions to the quadrupole ion optical device is attained. Further, the first and second pairs of opposing elongated electrodes are oriented substantially to match the acceptance axis to the axis of elongation defined by the spatial distribution.

The benefits of the invention may include better transmission and better peak shape at the output of the quadrupole ion optical device, especially at the lower mass side of the peak (so-called "left" flank). This may allow the use of a shorter quadrupole ion optical device to achieve the same performance and/or provide improved robustness to mechanical intolerances.

In the cases discussed directly above, the quadrupole device may be the Q1 device of the mass spectrometer. Additionally or alternatively, the quadrupole device may be downstream from the Q1 device of the mass spectrometer, such as the Q2 or Q3 device. Then, the rods of the quadrupole device may be oriented to be rotated with respect to the quadrupole rods of the immediately upstream quadrupole device by an angle, for example of the values or ranges discussed above. For instance, the Q2 device may be rotated with respect to the Q1 device and the Q3 device may be rotated with respect to the Q2 device.

BRIEF DESCRIPTION OF THE DRAWINGS

The invention may be put into practice in a number of ways, and a preferred embodiment will now be described by way of example only and with reference to the accompanying drawings, in which.

DETAILED DESCRIPTION OF A PREFERRED EMBODIMENT

Figure 1:
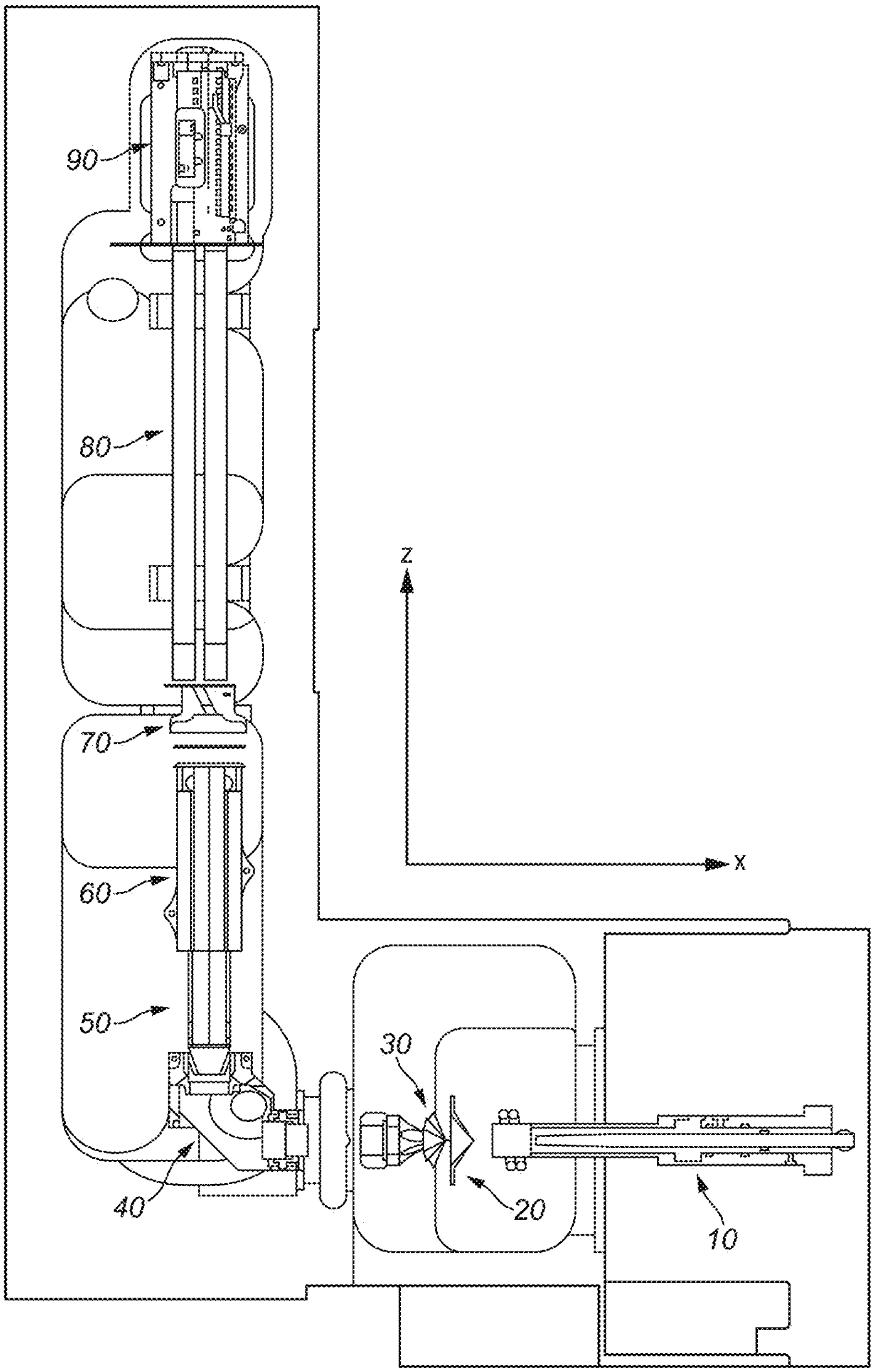
FIG. 1 depicts a schematic embodiment of an ICP mass spectrometer which can be operated in accordance with the invention.

Referring first to FIG. 1, there is depicted a schematic embodiment of a ICP mass spectrometer, comprising: an ion source 10, which is specifically an ICP torch in this embodiment; a sampler cone 20; a skimmer cone 30; ion optics 40; a first quadrupole (Q1) mass filter 50; a quadrupole collision/reaction cell (Q2) 60; a differentially pumped aperture 70; a second quadrupole (Q3) mass filter 80; and an ion detector 90. The Q3 mass filter 80 may be considered a mass analyser or a part of a mass analyser. Directional basis axes ('x' and 'z') are also shown, especially for reference to the orientation of the devices shown. A third basis axis ('y') is in the direction orthogonal to both the x and z basis axes (in other words, coming out of the page).

In this preferred embodiment, ions are produced in the ICP torch 10, introduced into vacuum via sampler 20 and skimmer 30, transported through (bending) ion optics 40 and selected by Q1 quadrupole mass filter 50. It will be noted that Q1 mass filter 50 is relatively short in comparison with Q2 reaction cell 60 and Q3 mass filter 80, and is schematically depicted so. Moreover, the vacuum conditions of the Q1 mass filter 50 are less demanding than for the subsequent stages. This may be due to the shorter Q1 mass filter 50 and therefore a decreased risk of ion to molecule collisions inside this device. Here, the ion optics 40 and Q1 mass filter 50 are operated at substantially the same pressure. Ions of the selected mass range pass into the quadrupole reaction cell 60 and the reaction product is directed through ion optics and differentially pumped aperture 70 into the analytical quadrupole mass filter Q3 80 and detected by high dynamic range detector 90, for example an SEM. A controller (not shown) operates the spectrometer. The controller typically comprises a computer processor. A computer program, when executed by the processor, enables control of the spectrometer so as to operate in accordance with the method of the invention. Methods of operating a mass spectrometer in accordance with this configuration are discussed in our co-pending patent application, GB 1516508.7 and the contents of that application are incorporated herein by reference.

The mass resolving quadrupole devices (Q1 quadrupole mass filter 50 and/or analytical quadrupole mass filter Q3 80) often have pre-filters and/or post-filters. Their purpose is to assist with (and aim to ensure) the effective transfer of the ions from the lens aperture before the quadrupole device into the quadrupole (in the case of the pre-filter) or the transfer from the quadrupole device into the lens aperture and downstream optics behind it (for the post-filter). As these devices only support the ion transfer, they do not change any of the considerations discussed herein, particularly below. Therefore, they are only mentioned in passing here, but they may be included in any implementation.

The ion beam, emerging from the extraction region (ion source 10, sampler cone 20, skimmer cone 30), has rotational symmetry to a high degree. The rotational symmetry is at least noticeable when looking at the average spatial distribution of the ion beam over a large number of measurements, for instance. In case of mechanical inaccuracies, a specific ion beam may have a random or accidental deviation from the symmetry, but no systematic deviation. In other words, this is a deviation which has a preferential orientation (for instance, when averaged over a large number of measurements). In this context, the axis along which the ion beam is travelling is the axis of symmetry. The ion optics 40 deflects the extracted ion beam by 90°. The deflected ion beam no longer has rotational symmetry about an axis defined by the ion beam's direction of travel. In particular, if the ions have a wide distribution of energies, their angular distribution will be different, even though these ions are still focused to the same point (an entry lens for the Q1 mass filter 50).

In particular, the ion optics 40 cause the ion beam to be spread more widely in the plane of the drawing of FIG. 1. If mechanical inaccuracies occur, a larger angular distribution may result or there may be a systematic deviation with a preferred orientation (for instance, when averaged over a large number of measurements). Some specific examples of this distribution will be discussed below.

Figure 2A:
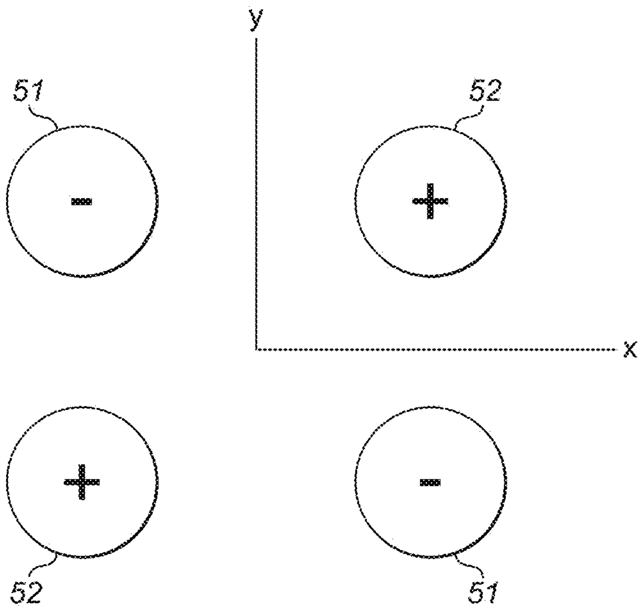
FIG. 2A PRIOR ART
FIG. 2A shows a cross-section of the rods of a known quadrupole device in a plane perpendicular to the direction of rod elongation.

With reference to FIG. 2A, there is shown a cross-section of the rods of a known quadrupole device in a plane perpendicular to the direction of rod elongation. As is well-known for a quadrupole device, two opposing pairs of rods are shown. The first pair of opposing rod electrodes 51 have a negative DC potential applied to them. The second pair of opposing rod electrodes 52 have a positive DC potential applied to them. Also shown are x and y basis axes in the two-dimensional plane, for comparison purposes with FIG. 1 and subsequent drawings. For guiding of ions in the quadrupole device, RF potentials are typically also applied to the rod electrodes. These are not shown for the sake of simplicity, however.

Figure 2B:
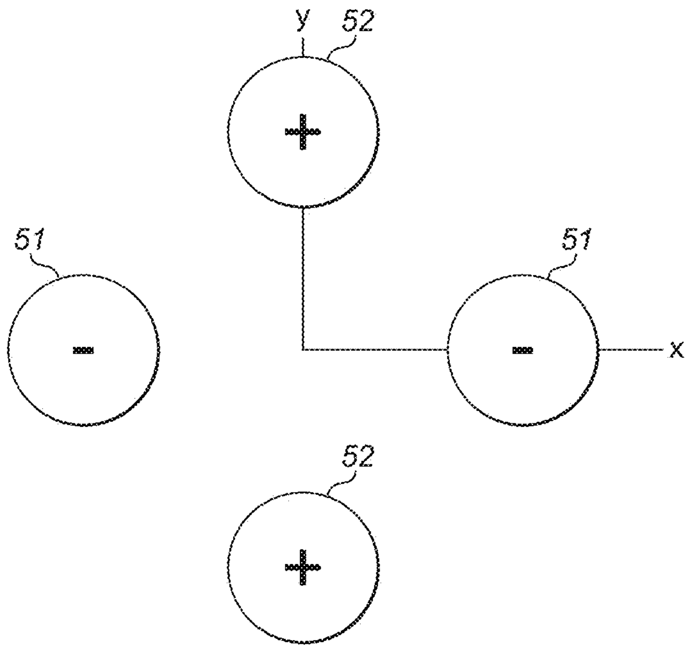
FIG. 2B shows a cross-section of the rods of a quadrupole device in line with the disclosure in a plane perpendicular to the direction of rod elongation, showing rotation of the rods compared with FIG. 2A.

Referring next to FIG. 2B, there is shown a cross-section of the rods of a quadrupole device in line with the disclosure in a plane perpendicular to the direction of rod elongation. Like FIG. 2A, the x and y basis axes are shown in the same orientation as the previous Figure. Similarly, a first pair of opposing rod electrodes 51, to which a negative DC potential is applied, and a second pair of opposing rod electrodes 52, to which a positive DC potential is applied, are shown. These rod electrodes are rotated within the two-dimensional plane by 45°, compared with the rod electrodes shown in FIG. 2A. Thus, the rod electrodes to which the negative DC potential is applied 51 are now aligned with the x-axis. This is also the axis along which a spatial distribution (and in this context, this may include an angular distribution) of the ion beam is elongated, as discussed above.

Figure 3:
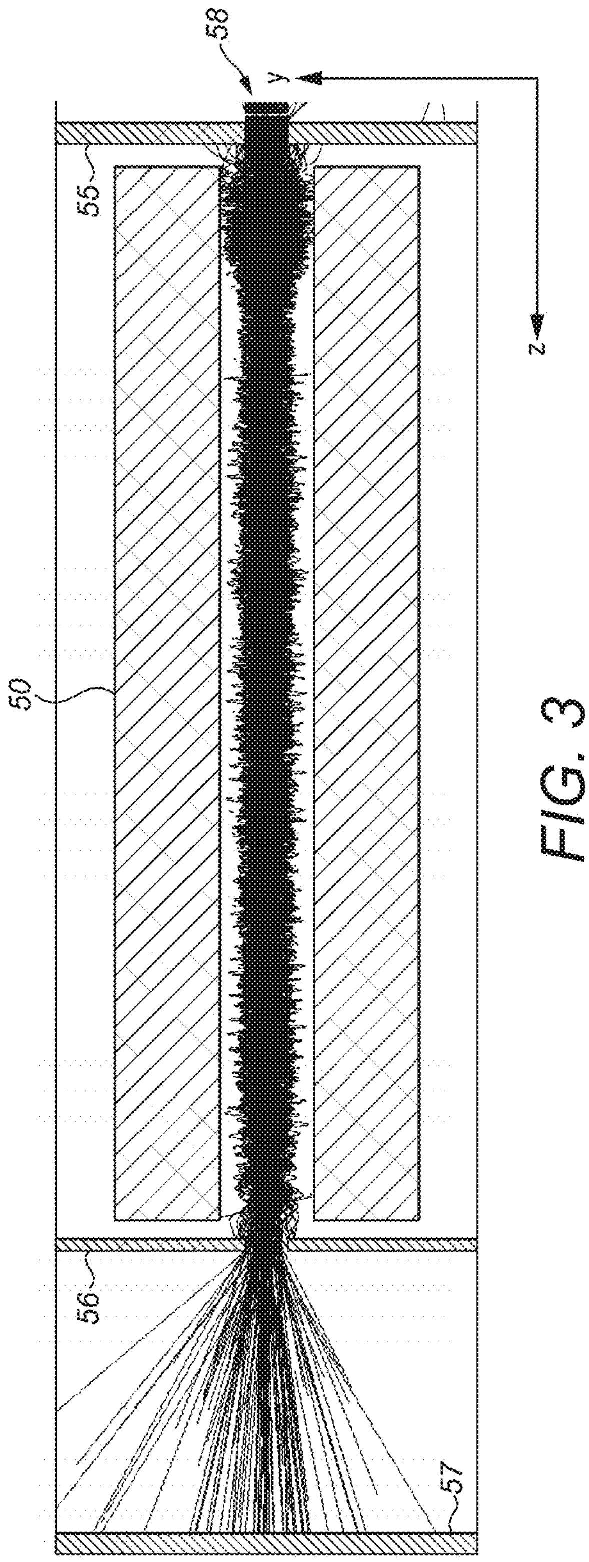
FIG. 3 illustrates simulated movement of ions into, through and out of a quadrupole device in accordance with FIG. 2B.

In order to observe the benefits of such an orientation, a simulation has been carried out using a quadrupole device in accordance with FIG. 2B. Referring now to FIG. 3, there is illustrated simulated movement of ions into, through and out of such a quadrupole device. The basis axes ('z' and 'y') are shown for comparison with the previous drawings. The simulation was applied to the case of positive ions. However, it will be immediately appreciated that the invention applies equally to the case of negative ions by appropriate changing of polarities on the various ion optics and electrodes. In this drawing, the quadrupole device is assumed to be the Q1 mass filter 50. An entrance lens 55 is provided upstream from the quadrupole device 50 and an exit lens 56 is provided downstream from the quadrupole device 50. Also shown is a test plane 57 downstream the exit lens 56. The simulated ion paths 58, starting at the right-hand side of the drawing and moving to the left, are additionally shown. For the simulation, the ions were started as a parallel beam of uniform beam density and circular, symmetrical spatial distribution of 1 mm diameter. The entrance lens 55, in particular, causes this parallel beam to be transformed into a beam having a spatial and angular distribution.

Figure 4:
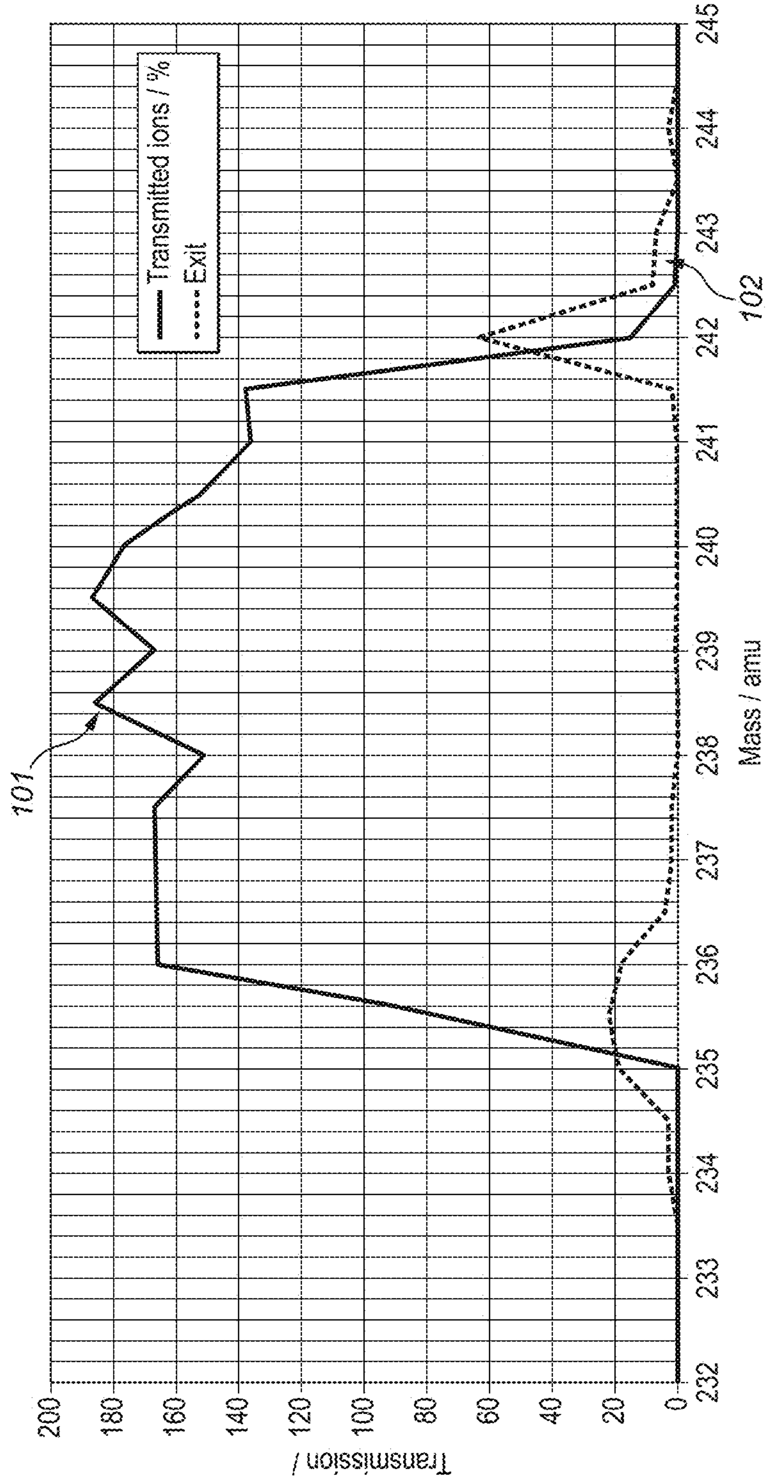
FIG. 4 depicts transmission and loss of ions against mass for the simulation of FIG. 3.

Referring next to FIG. 4, there are depicted curves of transmission and loss of ions against mass for this simulation. The transmission (acceptance) curve 101 shows the proportion of ions transmitted by the quadrupole device 50 and the loss curve 102 shows the proportion of ions lost at the exit of the quadrupole device 50. The simulated quadrupole device 50 was nominally set to accept ions of mass 240 amu. The transmission curve 101 therefore shows a peak with mass position 240 within the peak. However, it will be noted that mass position 240 does not sit in the center of the peak. In fact, the center of the transmission curve 101 is at approximately mass 238.8 amu. Calibration of the quadrupole device 50 is therefore highly desirable. Ions are lost at both flanks of the peak, as shown by loss curve 102. The ions are rejected within the quadrupole device or at the beginning of the quadrupole device, when the overall transmission of the quadrupole nears zero. However at the peak flanks, a number of ions are lost at the exit region of the quadrupole device 50.

Figure 5:
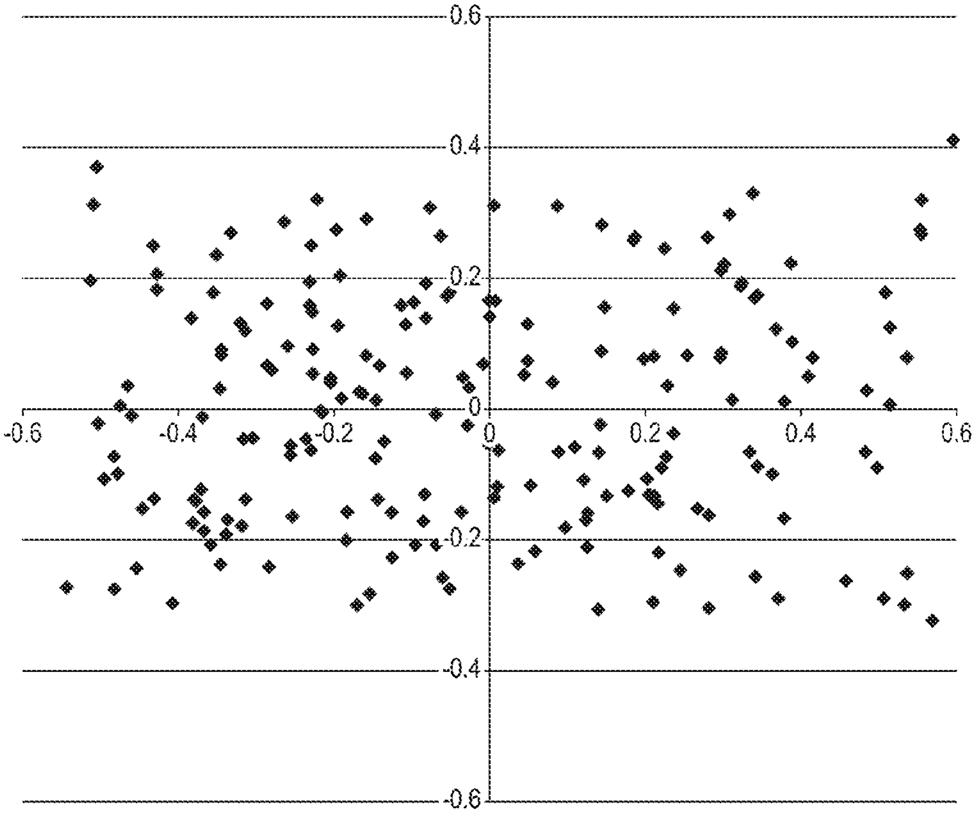
FIG. 5 shows an example spatial distribution for ions of a specific mass at the entrance to the quadrupole device in the simulation of FIG. 3.

More detailed investigation of the spatial distribution of the ions at the entrance to the quadrupole device 50 is therefore worthwhile. Referring next to FIG. 5, there is shown an example spatial distribution for ions of nominal mass 239 transmitted though the quadrupole at the entrance to the quadrupole device, based on the simulation results. This is plotted according to the x and y axes shown in FIG. 2B. A number of issues will be noted. Firstly, it can be immediately seen that the rotational symmetry of the ion beam in this plane has been lost. The ion beam has been squashed in the y direction and is therefore relatively elongated in the x direction. Ions appear to be lost in the y axis, which is closer to the rod electrodes with a positive DC potential applied 52. In fact, the spatial distribution of the ions appears to be more rectangularly shaped. Although this spatial distribution is shown for the quadrupole device configured to transmit a certain nominal mass, further simulation showed that changing that nominal acceptance mass did not appear to affect the shape of this spatial distribution.

Figure 6A:
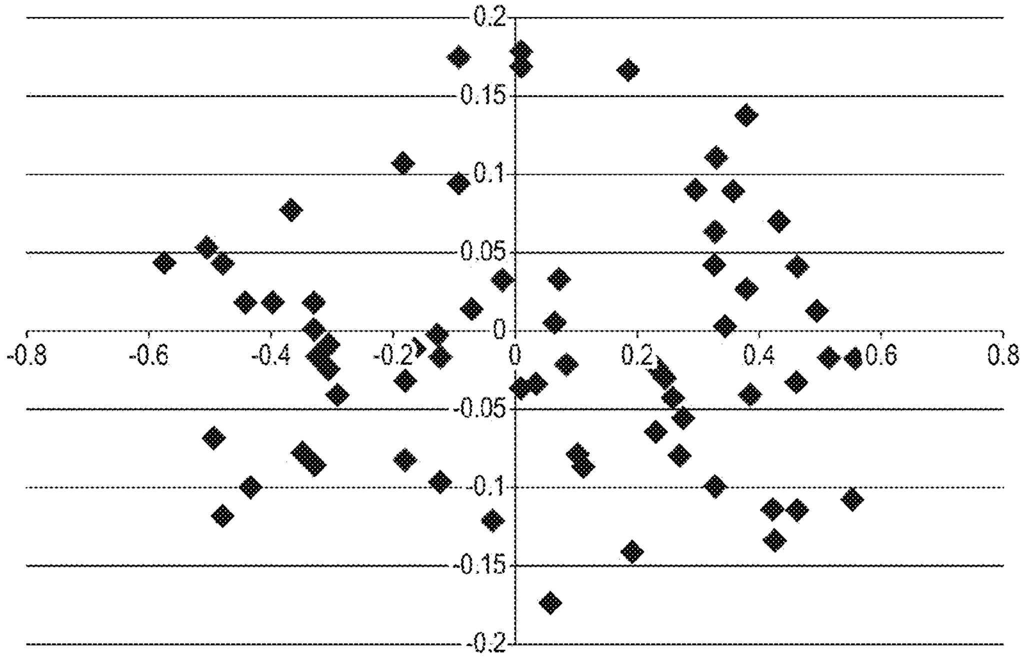
FIGS. 6A to 6D show further example spatial distributions for ions of different specific masses at the entrance to the quadrupole device in the simulation of FIG. 3.

The above analysis considers the center of the transmission curve 101 peak. Referring to FIG. 6A, there is shown a further example spatial distribution at the entrance to the quadrupole device in the simulation of FIG. 3, focusing on the "left" flank of the transmission curve peak, specifically mass 235.48 amu. Again, the spatial distribution of the ions in the x, y plane is shown. Here, the acceptance along the x-direction is much higher than along the y-direction. Again, simulation results suggest that changing the acceptance mass for which the quadrupole device is configured does not change this result. As a consequence of this, it would appear that a beam distribution that is more oriented within this acceptance range would result in a steeper peak flank and better abundance sensitivity.

Figure 6B:
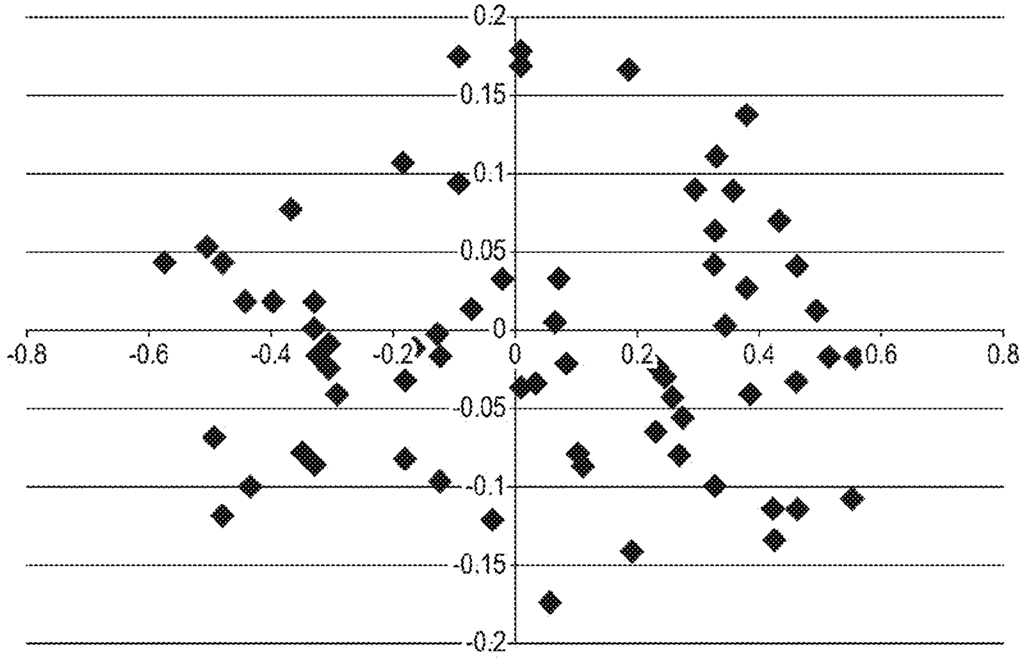

Referring next to FIG. 6B, there is shown another example spatial distribution at the entrance to the quadrupole device in the simulation of FIG. 3, at mass 241.9. This is on the "right" flank of the acceptance curve peak. The situation is less clear in this example. Indeed, at this mass, the rotational symmetry of the spatial distribution is approximately maintained.

Figure 6C:
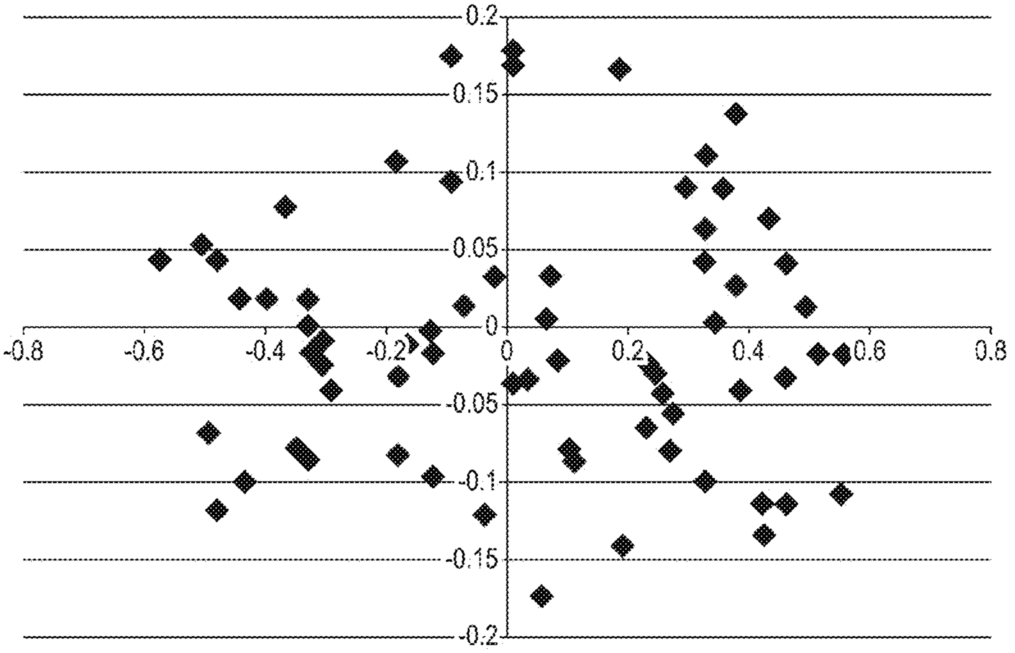

Referring to FIG. 6C, there is shown another spatial distribution for transmitted ions at the entrance to the quadrupole device in the simulation of FIG. 3, at mass 242 amu. Even with a minor change in the mass, the rotational symmetry is no longer preserved and the acceptance is greater in the x-direction than in the y-direction.

Figure 6D:
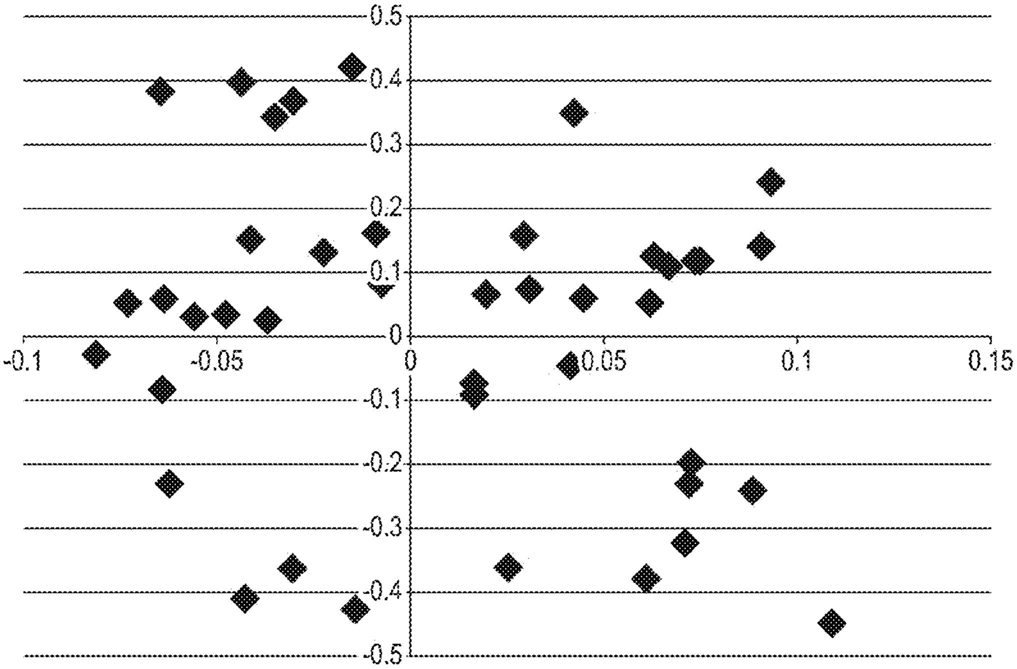

When the nominal acceptance mass of the quadrupole device was changed to 40 amu, similar results were observed. However, different results were observed when the nominal mass of the quadrupole device was adjusted to examine a Li peak at mass 8.2 amu. Referring now to FIG. 6D, the spatial distribution for ions at the entrance to the quadrupole device in the simulation of FIG. 3 at the "right" flank of an Li peak is shown. Here, the acceptance appears to favour the y-direction. This contrasts with the medium and higher masses, for which the acceptance at the "right" peak flank appears to be similarly oriented to the acceptance on the "left" peak flank. In some scenarios, it may be more desirable to favour the "left" peak flank, where the discrimination to a mass that is 1 amu lower may be achieved. Therefore, the fact that at low masses, the "right" flank of the transmission curve 101 peak may favour a different configuration may not be significantly relevant.

Based on these results, the following points will therefore be observed. For the overall transmission, it is advantageous to orient the quadrupole device 50 in a way that the rod electrodes to which the positive DC potential is applied 52 are oriented in the same axis as the rotational axis of the 90° deflection provided by the ion optics 40. In other words, the axis along which a maximum acceptance of ions is achieved in the quadrupole device is oriented substantially to match the axis of elongation of the spatial distribution of the ions. This orientation also appears to improve the peak shape flank for all masses on the "left" flank of the transmission curve peak (alternatively expressed as $m<M$, where M is the nominal acceptance mass for the quadrupole device or the center mass for the transmission curve peak). Equally, the orientation also appears to improve the peak shape for masses of at least (or greater than) 40 amu on the "right" flank of the transmission curve peak (alternatively, where $m>M$).

If the ion beam distribution in front of the Q1 is not or may not be homogeneous, the Q1 (or more generally any downstream quadrupole) should be oriented in a way that the line connecting rods having the negative DC voltage is along the broader beam distribution. As a special case of this, if there is any deflecting or bending element in front of the Q1 (including an element bending multiple times, such as a 'Z-bend' or 'Z-lens'), the Q1 should be positioned so that the line connecting rods having the positive DC voltage is parallel to the bending or deflection axis. Even slightly more advantageous would be to further rotate the Q1 orientation by 10 or 15 degrees (potentially in view of the rectangular spatial distribution of the ion beam, so that the acceptance axis of the quadrupole coincides more with the diagonal of the rectangular distribution).

In general terms, this can be expressed as a mass spectrometer, comprising: ion optics, configured to receive an ion beam and to process the received ion beam into an output ion beam, so as to cause the output ion beam to travel in an output direction and to have a spatial distribution (which may be an angular distribution) in a plane perpendicular to the output direction that is elongated in one dimension of the plane relative to the other dimension of the plane and defines an axis of elongation thereby; and a quadrupole ion optical device, comprising first and second pairs of opposing elongated electrodes arranged to receive the output ion beam travelling along the output direction. The first and second pairs of opposing elongated electrodes define an acceptance axis in a plane perpendicular to the direction of elongation of the first and second pairs of opposing elongated electrodes (or in a plane perpendicular to the output direction). The acceptance axis may be considered an axis on which a maximum acceptance of ions to the quadrupole ion optical device is attained. The first and second pairs of opposing elongated electrodes are oriented substantively to match the acceptance axis to the axis of elongation defined by the spatial distribution.

Equivalently, a general method of mass spectrometry may be provided, comprising: receiving an ion beam at ion optics; processing the received ion beam at the ion optics into an output ion beam, so as to cause the output ion beam to travel in an output direction and to have a spatial distribution in a plane perpendicular to the output direction that is elongated in one dimension of the plane relative to the other dimension of the plane and defines an axis of elongation thereby; and receiving the output ion beam travelling along the output direction at a quadrupole ion optical device. The quadrupole ion optical device comprises first and second pairs of opposing elongated electrodes that define an acceptance axis in a plane perpendicular to the direction of the elongation of the first and second pairs of opposing elongated electrodes. The acceptance axis is an axis on which maximum acceptance of ions to the quadrupole ion optical device is attained. The first and second pairs of opposing elongated electrodes are oriented substantively to match the acceptance axis to the axis of elongation defined by the spatial distribution.

A number of optional, preferable and/or advantageous features may apply to both the mass spectrometer and method of mass spectrometry. These are further defined herein and although some may be defined as structural, these may equally be implemented as method steps. Equivalently, any method steps may be implemented as structural features, for example by way of a controller configured to control the mass spectrometer (or a specific part of it) to perform the step.

The spatial distribution of the ions may define more than one axis of elongation (though there may only be one in certain cases). This may depend on the shape defined by the typical extent of the spatial distribution. An elliptical or rectangular shape have been considered, both of which may define more than one axis of elongation. Generally, if multiple axes of elongation are defined, the longest of these may be axis of elongation to which the acceptance axis is matched. For example in an elliptical shape, the major axis of the ellipse may be considered the axis of elongation. For a rectangular shape, the diagonal of the rectangle may be the preferred axis of elongation (and in some cases, the rectangular extent may define two diagonals and if the rectangular extent is not perfect in shape, the lengths of these diagonals may differ from each other). A length dimension of the rectangular extent may also be considered an axis of elongation (since the spatial distribution is elongated in the length dimension more than the width), although this may be less preferred. The match between the acceptance axis and the axis of elongation may not need to be precise. For instance, the acceptance axis may match the axis of elongation defined by the spatial distribution to within one of: 30 degrees; 25 degrees; 20 degrees; 15 degrees; 10 degrees; 5 degrees; 2 degrees; and 1 degree. A larger variation may particularly apply where more than one axis of elongation might be considered, for example in the case of a spatial distribution with an extent having a more rectangular shape than elliptical.

The quadrupole ion optical device may be selected from a range of different configurations. In some configurations, the first pair of opposing elongated electrodes are coupled to receive a negative DC potential and the second pair of opposing elongated electrodes are coupled to receive a positive DC potential. For example, this may include a linear ion trap or more preferably a transmission quadrupole or quadrupole mass filter. In such cases, the acceptance axis may be an axis defined by (between) the first pair of opposing elongated electrodes.

In another configuration of quadrupole ion optical device, the first and second pairs of opposing elongated electrodes are configured not to receive a DC potential and/or to receive only an RF potential. In this case, the acceptance axis may be defined between: a first gap between one of the first pair of opposing elongated electrodes and one of the second pair of opposing elongated electrodes; and a second gap opposite the first gap. In other words, the acceptance axis may be defined between two opposite gaps between electrodes. This arrangement with the acceptance axis defined between two opposite gaps between electrodes may be especially preferred where the pairs of elongated electrodes are provided with RF-only voltages.

In some embodiments, each of the first and second pair of opposing elongated electrodes are rod electrodes, typically with a generally round (for instance, circular, elliptical or hyperbolic) cross-section. In other embodiments, each of the first and second pair of opposing elongated electrodes are flat elongated electrodes (relatively rectangular in cross-section, in comparison with rod electrodes). This may be termed a “flatapole” or square quadrupole, as noted above. In either case, the quadrupole ion optical device optionally comprises one or both of: an entry lens for focusing ions received in the output ion beam; and an exit lens for focusing of ions exiting the quadrupole ion optical device.

It may be understood that the ion beam received by the ion optics has an initial direction of travel and an initial spatial distribution in a plane perpendicular to the first direction of travel. In some embodiments, the initial spatial distribution is rotationally symmetrical within the plane. Thus, the ion optics may cause the spatial distribution of the ion beam to change from relatively symmetrical to asymmetric and specifically, elongated in at least one direction. The ion optics may comprise a quadrupole rod electrode arrangement and may be configured to act as a mass filter (to mass select ions received in the output ion beam), a collisional cell for ions received in the output ion beam or as an ion guide to guide the ions through a certain distance.

In an embodiment, the ion optics is configured to process the received ion beam into an output ion beam by deflecting (or bending) the received ion beam by an angle or multiple angles (for instance, using a combination of bending elements, such as a ‘Z-lens’). The angle of deflection is typically greater than (or in some cases, at least) 45 degrees. An angle of 45 degrees or greater may cause the spatial distribution of the ion beam to become asymmetric. The angle of deflection may be up to 100 degrees for example. Preferably, the angle of deflection is approximately 90 degrees (plus or minus 1, 2, 5 or 10 degrees, for instance). In this sense, the ion optics may be configured to deflect (or bend) the received ion beam about at least one deflection or rotation axis and potentially about multiple deflection or rotation axes. In an aspect that may be independent or connected with any other aspect disclosed herein, where the second pair of opposing elongated electrodes are coupled to receive a positive DC potential, the quadrupole ion optical device is arranged such that an axis between the second pair of opposing elongated electrodes is aligned with the deflection axis (or one or more than one of the deflection axes). Thus, the generalised ion optics may correspond with the ion optics 40, discussed above. However, this is not necessarily the case and the generalised ion optics may correspond with another ion optical device, such as those downstream from the ion optics 40, including Q1 mass filter 50 and Q2 cell 60, for instance.

In the preferred embodiment, the mass spectrometer further comprises an ion source, preferably an ICP ion source, arranged to generate the ion beam received by the ion optics. Then, the mass spectrometer may be configured so that the direction of travel of the ion beam remains the same between the ion source and the ion optics.

Optionally, a pre-filter is provided upstream from the quadrupole ion optical device (and preferably downstream from the ion optics). The pre-filter may be configured to support or assist the effective transfer of ions from a lens aperture immediately upstream the quadrupole ion optical device into the quadrupole ion optical device. Additionally or alternatively, a post-filter may be provided downstream from the quadrupole ion optical device. The post-filter may be configured to support or assist the effective transfer of ions from the quadrupole ion optical device into a lens aperture immediately downstream from the quadrupole ion optical device.

In cases, the ion optics are configured such that mass-to-charge ratios of the ions in the output ion beam are at least a threshold value, for example one of: 10 amu; 20 amu; 40 amu; 100 amu. As noted above, this approach may not be preferred for ions of high masses in some cases.

Figure 7:
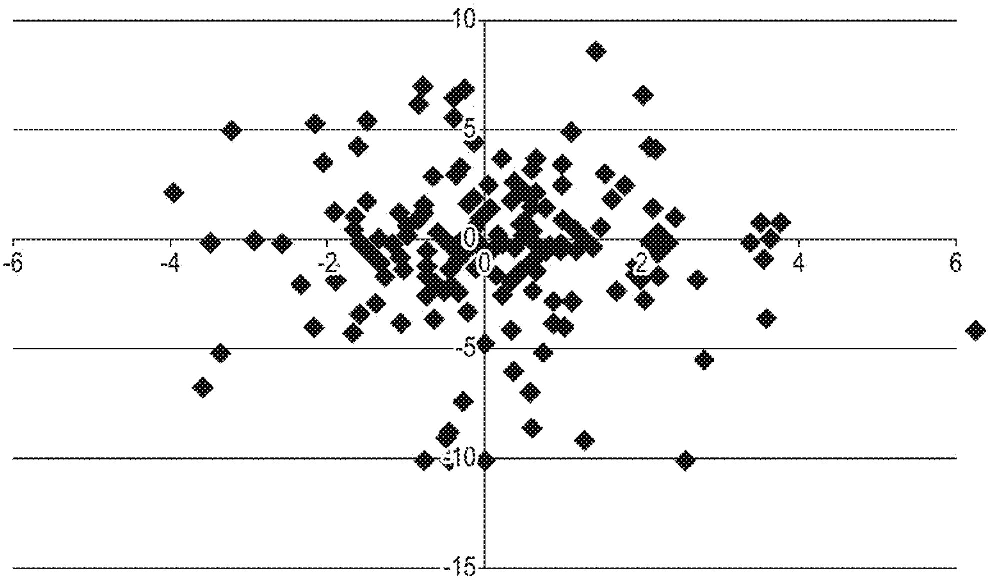
FIG. 7 shows an example spatial distribution for ions of a specific mass at the exit of the quadrupole device in the simulation of FIG. 3.

More specific embodiments will now be described. Referring next to FIG. 7, there is shown an example spatial distribution for ions at the exit of the quadrupole device in the simulation of FIG. 3 (that is, as the ions would strike the test plane 57). This is at the specific nominal mass 239 amu, of a U peak. Here, it would be seen that the y-axis is favoured. Although example spatial distributions are not shown, further simulation has shown that this is valid for all masses and for both peak flanks at all masses. Therefore, it would appear that the downstream quadrupole device, which accepts the ion beam from the exit of the first quadrupole device 50 and which in this case would be the Q2 reaction cell 60, should be rotated by 90° with respect to the upstream quadrupole ion optical device, which is the Q1 mass filter 50. This is typically the case if the second, downstream quadrupole device has DC voltages applied to its opposing pairs of electrodes. In other words, its DC potentials (polarities) would be rotated 90 degrees with respect to the DC potentials of the first quadrupole.

However, such an angle of rotation is not necessarily the case. In practice, the Q2 reaction cell 60 may be a different kind of quadrupole device. In particular, embodiments wherein Q2 may comprise an RF-only quadrupole, for example used as a collision cell, and/or a flatapole configuration may be considered. In cases of RF-only quadrupoles, the rods can have a circular, elliptical, hyperbolic or rectangular cross-section. As described above, the rods of such a flatapole configuration have a rectangular cross-section. In particular, no DC potentials are applied to the rod electrodes of a flatapole. Therefore, the acceptance is the same towards each rod. In practice, it is observed that the acceptance is higher in the diagonal between the rods.

Figure 8:
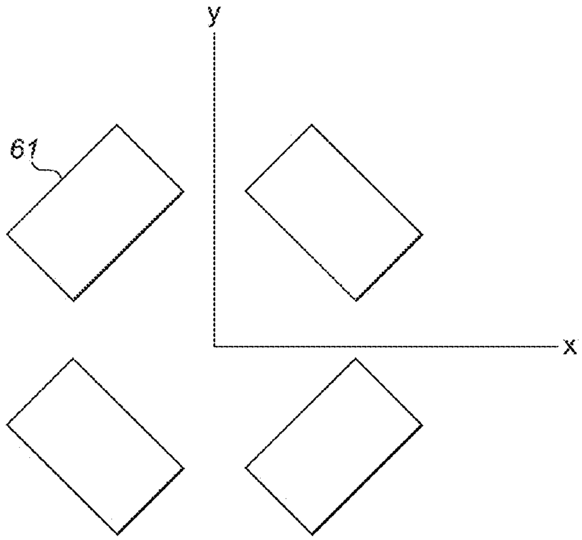
FIG. 8 shows a cross-section of the rods of a quadrupole device having flat rod electrodes in line with the disclosure in a plane perpendicular to the direction of rod elongation, for a reaction cell showing rotation of the rods compared with FIG. 2B.

Referring next to FIG. 8, there is shown a cross-section of the rods of a quadrupole device having flat rod electrodes in a plane perpendicular to the direction of rod elongation, for a reaction cell showing rotation of the rods compared with FIG. 2B. The same x-axis and y-axis are shown. The RF flat rod electrodes 61 are effectively rotated by 45° in comparison with the rounded DC-carrying rod electrodes of the Q1 quadrupole device 50, as described with reference to FIG. 2B.

In view of the above, it is suggested that the emittance of the Q1 DC/RF quadrupole device 50 (for all masses and both peak flanks) and the acceptance of the Q2 RF-only collision/reaction cell 60 fits best together if the rod orientation of both devices is rotated by 45° relative to each other. In other words, if the collision cell has an (effective) quadrupole field, it should be oriented 45° tilted towards the Q1 quadrupole field.

The emittance of an RF-only quadrupole device, such as collision/reaction cell 60, also favours positions between the rods for ions having a certain distance from the middle axis. In other words, the emittance of such an RF-only quadrupole device is has a similar spatial profile to its acceptance. For this reason, it is suggested that the Q3 80 rods should be rotated by 45° relative to the collision cell 60 (CCT) rods. In other words, if the collision cell has an (effective) quadrupole field, the Q3 quadrupole field should be oriented 45° tilted towards the collision cell quadrupole field.

The positioning and the aperture opening of the SEM detector 90 appears not be critical for the overall transmission. This may be because the detector acceptance is broad. This also seems reasonable because of a large accelerating voltage between Q3 80 and detector 90.

Figure 9:
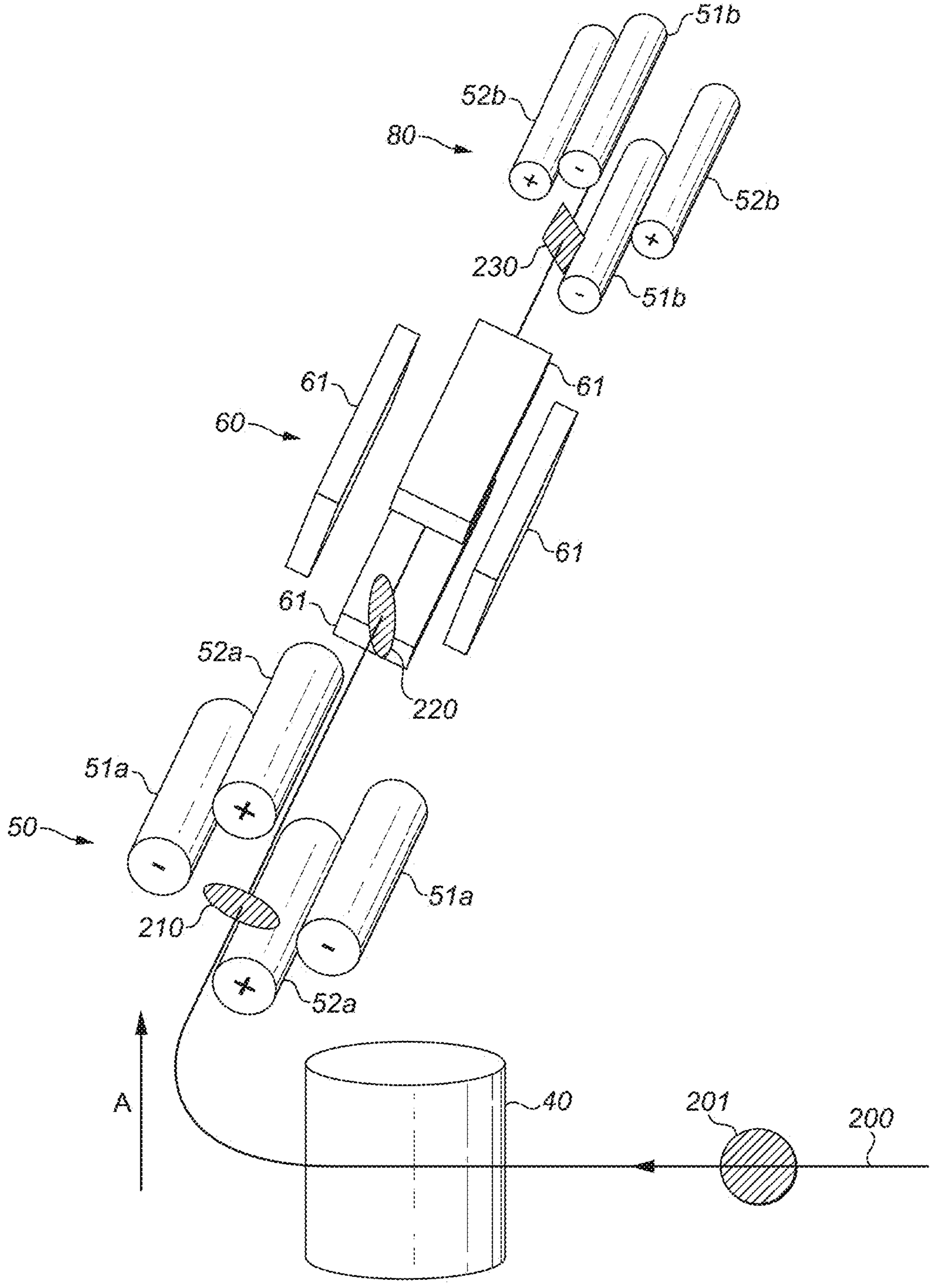
FIG. 9 illustrates, in a three-dimensional view, a schematic of three quadrupole devices in accordance with an embodiment, based on the configuration of FIG. 1.

It is useful to see the relative configurations of the three quadrupole devices together. Referring now to FIG. 9, there is therefore illustrated, in a three-dimensional view, a schematic of the three quadrupole devices in accordance with an embodiment, based on the configuration of FIG. 1. Where the same devices have been depicted, identical reference numerals have been used. There is therefore shown: ion optics 40; first quadrupole (Q1) mass filter 50; the quadrupole collision/reaction cell (Q2) 60; and the second quadrupole (Q3) mass filter 80. Also shown (for illustrative purposes) are the path of the ion beam 200 and depictions of the angular distribution (which may be representative of the spatial distribution to a certain extent) of the beam cross-section at four locations: a first distribution 201, immediately upstream the ion optics 40; a second distribution 210, at the entrance to the Q1 mass filter 50; a third distribution 220, at the entrance to the Q2 cell 60 (that is, the exit of Q1), and a fourth distribution 230, at the entrance to the Q3 mass filter 80 (that is, the exit of Q2). Moreover, the axis of deflection A caused by the ion optics 40 is further shown.

The first distribution 201 is approximately symmetrical and contrasts with the second distribution 210, which is elongated as a result of the 90 degrees beam deflection caused by ion optics 40. The Q1 mass filter 50 comprises: a first pair of opposing elongated electrodes 51*a*, to which a negative DC potential is applied; and a second pair of opposing elongated electrodes 52*a*, to which a positive DC potential is applied. The first pair of opposing elongated electrodes 51*a* are oriented to align with the axis of elongation of the first distribution 210. In another sense, it may be seen that second pair of opposing elongated electrodes 52*a* are oriented to align with the axis of deflection A due to the ion optics 40.

The third distribution 220 is rotated by 90 degrees in comparison with the second distribution 210. However, since the Q2 cell 60 is a RF-only “flatapole” quadrupole device, comprising flat electrodes 61 (in accordance with those shown in FIG. 8), the acceptance axis of the device is defined by the gaps between the electrodes. Therefore, the orientation of the flat electrodes 61 is 45 degrees offset in comparison with the orientation of the rod electrodes 51 and 52 of the Q1 mass filter 50.

The Q3 mass filter 80 comprises: a first pair of opposing elongated electrodes 51*b*, to which a negative DC potential is applied; and a second pair of opposing elongated electrodes 52*b*, to which a positive DC potential is applied. The fourth distribution 230 is elongated (although more symmetric than the second distribution 210 or third distribution 220) and the first pair of opposing elongated electrodes 51*b* are oriented to align with the axis of elongation of the fourth distribution 230. Therefore, the orientation of the Q3 mass filter 80 is 45 degrees offset in comparison with the orientation of the Q2 cell 60 and thus 90 degrees offset in comparison with the orientation of the Q1 mass filter 50.

In general terms, the following may be further considered. The skilled person may consider the quadrupole ion optical device as a first quadrupole ion optical device. The first quadrupole ion optical device may be configured to provide a first ion beam by mass selection of ions received in the output ion beam. The mass spectrometer optionally comprises at least one further quadrupole ion optical device downstream from the first quadrupole ion optical device. For example, the at least one further quadrupole ion optical device may comprise a second quadrupole ion optical device downstream from the first quadrupole ion optical device. In some embodiments, the at least one further quadrupole ion optical device may further comprise a third quadrupole ion optical device downstream from the second quadrupole ion optical device.

Where the ion optics (upstream the quadrupole ion optical device) comprises a quadrupole rod electrode arrangement, the first and second pairs of opposing elongated electrodes (of the quadrupole ion optical device) are beneficially oriented to be rotated with respect to the quadrupole rod electrode arrangement of the ion optics by an initial rotational angle, in a plane perpendicular to the output direction. The initial rotational angle is typically at least (or greater than) 30 and/or no more (or less) than 60 degrees and preferably about 45 degrees. Alternatively, the initial rotational angle may be at least (or greater than) 75 and/or no more (or less) than 105 degrees and preferably about 90 degrees in that case.

The second quadrupole ion optical device is advantageously configured to receive the first ion beam. Beneficially, the second quadrupole ion optical device comprises third and fourth pairs of opposing elongated electrodes configured to receive the first ion beam from the first quadrupole ion optical device. In a plane perpendicular to a direction of travel of the first ion beam (and/or the direction of elongation of the third and fourth pairs of opposing elongated electrodes), the third and fourth pairs of opposing elongated electrodes are preferably oriented to be rotated with respect to the first and second pairs of opposing elongated electrodes by a first rotational angle. The first rotational angle is typically at least (or greater than) 30 and/or no more (or less) than 60 degrees (especially when the first and second pairs of opposing elongated electrodes have DC potentials applied and the third and fourth pairs of opposing elongated electrodes have no DC potentials or only RF potentials applied, or vice versa) and preferably about 45 degrees in this case. Alternatively, the first rotational angle may be at least (or greater than) 75 and/or no more (or less) than 105 degrees and preferably about 90 degrees. This may be the case where both the first and second quadrupole ion optical devices are DC/RF devices.

In the preferred embodiment, the second quadrupole ion optical device is further configured to act as a collision cell for ions received in the first ion beam. Fragmentation and/or collisional cooling of the received ions may thereby be possible. In this case, the second quadrupole ion optical device may be arranged to be gas-filled. Additionally or alternatively, it may be configured to provide a second ion beam from ions received in the first ion beam.

The third quadrupole ion optical device is preferably configured to provide a third ion beam by mass selection of ions received in the second ion beam. Advantageously, the third quadrupole ion optical device comprises fifth and sixth pairs of opposing elongated electrodes configured to receive an ion beam from the second quadrupole ion optical device. In a plane perpendicular to a direction of travel of the second ion beam, the fifth and sixth pairs of opposing elongated electrodes may be oriented to be rotated with respect to the third and fourth pairs of opposing elongated electrodes by a second rotational angle. The second rotational angle is typically at least (or greater than) 30 and/or no more (or less) than 60 degrees (especially when the third and fourth pairs of opposing elongated electrodes have no DC potentials applied or only RF potentials applied and the fifth and sixth pairs of opposing elongated electrodes have DC potentials applied, or vice versa) and preferably about 45 degrees in this case. Alternatively, the second rotational angle may be at least (or greater than) 75 and/or no more (or less) than 105 degrees and preferably about 90 degrees. This may be the case, for example, where both the third and fourth pairs of opposing elongated electrodes as well as the fifth and sixth pairs of opposing elongated electrodes are DC/RF electrodes.

The third and fourth pairs of opposing elongated electrodes may each be rod electrodes of round (circular, elliptical, hyperbolic) or rectangular cross-section (each of the electrodes of the third and fourth pairs would typically have the same shape and preferably sized cross-section). Typically, the cross-section of the third and fourth pairs of opposing elongated electrodes is rectangular. Similarly, the fifth and sixth pairs of opposing elongated electrodes may each be rod electrodes of round (circular, elliptical, hyperbolic) or rectangular cross-section (each of the electrodes of the fifth and sixth pairs would typically have the same shape and preferably sized cross-section). Typically, the cross-section of the fifth and sixth pairs of opposing elongated electrodes is round.

Although a specific embodiment has been described, the skilled person will appreciate that various modifications and alternations are possible. For example, an alternative approach may be to apply an ion focusing element with a (static) quadrupole field between the Q1 quadrupole device 50 and the Q2 collision cell 60 to shape the ion beam towards a more uniform shape.

In general terms, the mass spectrometer optionally further comprises an ion focusing element, configured to receive the first ion beam and to generate a focused ion beam from the first ion beam. The focused ion beam has a spatial distribution in a plane perpendicular to the direction of travel of the focused ion beam. Advantageously, the ion focusing element is configured such that the spatial distribution of the focused ion beam is substantively symmetrical. Beneficially, the ion focusing element comprises a quadrupole ion optical device. More preferably, the quadrupole ion optical device of the ion focusing element is configured to generate a static quadrupole field.

Ion optics 40 typically bends or reflects the ion beam one or several times. The ion optics need not cause a 90 degree bend in the ion beam direction in order to cause the ion beam spatial distribution to become asymmetric. For example, imprecise or incorrect mechanical or electronic adjustments may cause the ion beam to be somewhat off-axis or have a slightly tilted main axis with respect to the ideal. In another approach, bending elements with parallel rotational axes may be combined, leading to a “z-shape” or “dog-leg” change in direction for the ion beam. Such ion optics may be provided in addition or as an alternative to ion optics 40 in embodiments.

It will therefore be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as “a” or “an” (such as an analogue to digital convertor) means “one or more” (for instance, one or more analogue to digital convertor). Throughout the description and claims of this disclosure, the words “comprise”, “including”, “having” and “contain” and variations of the words, for example “comprising” and “comprises” or similar, mean “including but not limited to”, and are not intended to (and do not) exclude other components.

The use of any and all examples, or exemplary language (“for instance”, “such as”, “for example” and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A mass spectrometer, comprising:

ion optics, configured to receive an ion beam and to process the received ion beam into an output ion beam, so as to cause the output ion beam to travel in an output direction and to have a spatial distribution in a plane perpendicular to the output direction that is elongated in one dimension of the plane relative to the other dimension of the plane and defines an axis of elongation thereby;

a quadrupole ion optical device, comprising first and second pairs of opposing elongated electrodes arranged to receive the output ion beam travelling along the output direction, the first and second pairs of opposing elongated electrodes defining an acceptance axis in a plane perpendicular to the direction of elongation of the first and second pairs of opposing elongated electrodes, the acceptance axis being an axis on which maximum acceptance of ions to the quadrupole ion optical device is attained; and wherein the first and second pairs of opposing elongated electrodes are oriented substantially to match the acceptance axis to the axis of elongation defined by the spatial distribution.

2. The mass spectrometer of claim 1, wherein the acceptance axis matches the axis of elongation defined by the spatial distribution to within one of: 30 degrees; 20 degrees; 15 degrees; 10 degrees; or 5 degrees.

3. The mass spectrometer of claim 1, wherein the spatial distribution of the output ion beam has an extent that is approximately elliptical, the axis of elongation being defined by a major axis of the elliptical extent.

4. The mass spectrometer of claim 1, wherein the spatial distribution of the output ion beam has an extent having a rectangular shape, the axis of elongation being defined by a diagonal of the rectangular shape.

5. The mass spectrometer of claim 1, wherein the first pair of opposing elongated electrodes are coupled to receive a negative DC potential and the second pair of opposing elongated electrodes are coupled to receive a positive DC potential and wherein the acceptance axis is an axis between the first pair of opposing elongated electrodes.

6. The mass spectrometer of claim 1, wherein each of the first and second pair of opposing elongated electrodes are coupled to receive only RF potentials and wherein the acceptance axis is defined between: a first gap between one of the first pair of opposing elongated electrodes and one of the second pair of opposing elongated electrodes; and a second gap opposite the first gap.

7. The mass spectrometer of claim 1, wherein the ion beam received by the ion optics has an initial direction of travel and an initial spatial distribution in a plane perpendicular to the initial direction of travel, the initial spatial distribution being rotationally symmetrical within the plane.

8. The mass spectrometer claim 1, wherein the ion optics is configured to process the received ion beam into an output ion beam by deflecting the received ion beam by at least one angle.

9. The mass spectrometer of claim 8, wherein the angle of deflection is greater than 45 degrees.

10. The mass spectrometer of claim 8, wherein the angle of deflection is approximately 90 degrees.

11. The mass spectrometer of claim 10, wherein the ion optics is configured to deflect the received ion beam about a deflection axis, wherein the second pair of opposing elongated electrodes are coupled to receive a positive DC potential and wherein the quadrupole ion optical device is arranged such that an axis between the second pair of opposing elongated electrodes is aligned with the deflection axis.

12. The mass spectrometer of claim 1, further comprising:

an ion source, arranged to generate the ion beam received by the ion optics; and wherein the mass spectrometer is configured so that the direction of travel of the ion beam remains the same between the ion source and the ion optics.

13. The mass spectrometer of claim 1, wherein the quadrupole ion optical device is a first quadrupole ion optical device, the mass spectrometer comprising at least one further quadrupole ion optical device downstream from the first quadrupole ion optical device.

14. The mass spectrometer of claim 13, wherein the first quadrupole ion optical device is configured to provide a first ion beam by mass selection of ions received in the output ion beam.

15. The mass spectrometer of claim 13, wherein the at least one further quadrupole ion optical device comprises: a second quadrupole ion optical device downstream from the first quadrupole ion optical device; and a third quadrupole ion optical device downstream from the second quadrupole ion optical device.

16. The mass spectrometer of claim 15, wherein the first quadrupole ion optical device is configured to provide a first ion beam from ions received in the output ion beam and wherein the second quadrupole ion optical device is configured to receive the first ion beam and act as a collision cell for ions received in the first ion beam.

17. The mass spectrometer of claim 16, wherein the second quadrupole ion optical device is arranged to be gas-filled.

18. The mass spectrometer of claim 15, wherein the first quadrupole ion optical device is configured to provide a first ion beam by mass selection of ions received in the output ion beam and the second quadrupole ion optical device is configured to provide a second ion beam from ions received in the first ion beam; and wherein the third quadrupole ion optical device is configured to provide a third ion beam by mass selection of ions received in the second ion beam.

19. The mass spectrometer of claim 13, wherein the first quadrupole ion optical device is configured to provide a first ion beam from ions received in the output ion beam; and wherein the at least one further quadrupole ion optical device comprises a second quadrupole ion optical device comprising third and fourth pairs of opposing elongated electrodes configured to receive the first ion beam from the first quadrupole ion optical device.

20. The mass spectrometer of claim 19, wherein in a plane perpendicular to a direction of travel of the first ion beam, the third and fourth pairs of opposing elongated electrodes are oriented to be rotated with respect to the first and second pairs of opposing elongated electrodes by a first rotational angle.

21. The mass spectrometer of claim 20, wherein the second quadrupole ion optical device is configured to provide a second ion beam from ions received in the first ion beam;

wherein the third quadrupole ion optical device comprises fifth and sixth pairs of opposing elongated electrodes configured to receive an ion beam from the second quadrupole ion optical device.

22. The mass spectrometer of claim 21, wherein in a plane perpendicular to a direction of travel of the second ion beam, the fifth and sixth pairs of opposing elongated electrodes are oriented to be rotated with respect to the third and fourth pairs of opposing elongated electrodes by a second rotational angle.

23. The mass spectrometer of claim 22, wherein the ion optics comprises a quadrupole rod electrode arrangement and wherein in a plane perpendicular to the output direction, the first and second pairs of opposing elongated electrodes are oriented to be rotated with respect to the quadrupole rod electrode arrangement of the ion optics by an initial rotational angle.

24. The mass spectrometer of claim 23, wherein the ion optics is configured to act as a mass filter.

25. The mass spectrometer of claim 23, wherein one or more of the first rotational angle, the second rotational angle and the initial rotational angle is between 30 and 60 degrees.

26. The mass spectrometer of claim 25, wherein one or more of the first rotational angle, the second rotational angle and the initial rotational angle is about 45 degrees.

27. The mass spectrometer of claim 23, wherein one or more of the first rotational angle, the second rotational angle and the initial rotational angle is between 75 and 105 degrees.

28. The mass spectrometer of claim 27, wherein one or more of the first rotational angle, the second rotational angle and the initial rotational angle is about 90 degrees.

29. The mass spectrometer of claim 1, wherein the quadrupole ion optical device is configured to provide a first ion beam from ions received in the output ion beam, the mass spectrometer further comprising:

an ion focusing element, configured to receive the first ion beam and to generate a focused ion beam from the first ion beam, the focused ion beam having a spatial distribution in a plane perpendicular to the direction of travel of the focused ion beam, the ion focusing element being further configured such that the spatial distribution of the focused ion beam is substantially symmetrical.

30. A method of mass spectrometry, comprising:

receiving an ion beam at ion optics;

processing the received ion beam at the ion optics into an output ion beam, so as to cause the output ion beam to travel in an output direction and to have a spatial distribution in a plane perpendicular to the output direction that is elongated in one dimension of the plane relative to the other dimension of the plane and defines an axis of elongation thereby;

receiving the output ion beam travelling along the output direction at a quadrupole ion optical device, comprising first and second pairs of opposing elongated electrodes, the first and second pairs of opposing elongated electrodes defining an acceptance axis in a plane perpendicular to the direction of elongation of the first and second pairs of opposing elongated electrodes, the acceptance axis being an axis on which maximum acceptance of ions to the quadrupole ion optical device is attained; and wherein the first and second pairs of opposing elongated electrodes are oriented substantially to match the acceptance axis to the axis of elongation defined by the spatial distribution.

* * * * *